(12) United States Patent
Saiki

(10) Patent No.: US 7,571,787 B2
(45) Date of Patent: Aug. 11, 2009

(54) HEADLIGHT MOUNTING ARRANGEMENT

(75) Inventor: Scott J. Saiki, Dousman, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 284 days.

(21) Appl. No.: 11/535,257

(22) Filed: Sep. 26, 2006

(65) Prior Publication Data

US 2007/0075514 A1 Apr. 5, 2007

Related U.S. Application Data

(60) Provisional application No. 60/722,115, filed on Sep. 30, 2005.

(51) Int. Cl.
*B62D 61/06* (2006.01)

(52) U.S. Cl. ................................ 180/210; 180/908

(58) Field of Classification Search .................. 180/210, 180/311, 312, 908; 280/5.509, 124.103, 280/124.134; 362/43, 52, 57, 59, 469, 473, 362/476, 507, 525, 475
See application file for complete search history.

(56) References Cited

U.S. PATENT DOCUMENTS

| | | | | |
|---|---|---|---|---|
| 1,975,117 | A | * 10/1934 | Millington | .................... 362/59 |
| 2,279,120 | A | 4/1942 | Hurley | |
| 2,641,480 | A | * 6/1953 | Bancroft | .............. 280/124.103 |
| 2,689,747 | A | * 9/1954 | Kolbe | .................. 280/124.103 |
| 2,788,986 | A | 4/1957 | Kolbe | |
| 2,961,254 | A | * 11/1960 | Muller | ................. 280/124.103 |
| 3,008,729 | A | 11/1961 | Muller et al. | |
| 3,572,456 | A | * 3/1971 | Healy | ......................... 180/217 |
| 3,610,358 | A | 10/1971 | Korff | |
| 3,776,353 | A | 12/1973 | Roth | |
| 3,826,326 | A | 7/1974 | Blair | |
| 3,938,609 | A | 2/1976 | Kensaku et al. | |
| 3,966,006 | A | 6/1976 | Cullinan | |
| 3,977,694 | A | 8/1976 | Nordstrom | |
| D242,849 | S | 12/1976 | Gilbert | |
| 4,020,914 | A | 5/1977 | Trautwein | |
| 4,045,048 | A | 8/1977 | Irwin | |
| 4,047,732 | A | 9/1977 | Williams et al. | |
| 4,049,287 | A | 9/1977 | Dudouyt | |
| 4,050,711 | A | 9/1977 | Denzer | |
| 4,050,712 | A | 9/1977 | Denzer et al. | |
| 4,050,713 | A | 9/1977 | Williams | |
| 4,054,300 | A | 10/1977 | Winchell | |
| 4,064,957 | A | 12/1977 | Parham | |

(Continued)

FOREIGN PATENT DOCUMENTS

WO     2005002957 A1     1/2005

*Primary Examiner*—Paul N Dickson
*Assistant Examiner*—Laura Freedman
(74) *Attorney, Agent, or Firm*—Michael Best & Friedrich LLP

(57) ABSTRACT

A vehicle comprising a frame, at least one wheel operable to contact a substantially horizontal support surface, a prime mover supported by the frame and in driving engagement with the at least one wheel, a suspension system operable to maintain the frame in an upright position while driving along a straight path and to permit the frame to lean relative to the support surface while cornering, and at least two headlights coupled to the suspension system and arranged in a substantially horizontal configuration, wherein the headlights remain in the substantially horizontal configuration when the frame is in the upright position and when the frame is leaning.

20 Claims, 8 Drawing Sheets

U.S. PATENT DOCUMENTS

| | | | |
|---|---|---|---|
| 4,065,144 A | 12/1977 | Winchell | |
| 4,065,146 A | 12/1977 | Denzer | |
| 4,071,261 A | 1/1978 | Winchell | |
| 4,072,325 A | 2/1978 | Bright et al. | |
| 4,076,270 A | 2/1978 | Winchell | |
| 4,087,104 A | 5/1978 | Winchell et al. | |
| 4,087,106 A | 5/1978 | Winchell | |
| 4,087,107 A | 5/1978 | Winchell | |
| 4,087,108 A | 5/1978 | Winchell | |
| 4,088,199 A | 5/1978 | Trautwein | |
| 4,088,338 A | 5/1978 | Winchell et al. | |
| 4,114,713 A | 9/1978 | Mery | |
| 4,119,170 A | 10/1978 | Hutcherson | |
| 4,123,079 A | 10/1978 | Biskup | |
| 4,133,551 A | 1/1979 | Biskup | |
| 4,159,128 A | 6/1979 | Blaine | |
| 4,162,605 A | 7/1979 | Olin et al. | |
| 4,165,093 A | 8/1979 | Biskup | |
| 4,237,995 A | 12/1980 | Pivar | |
| 4,277,076 A | 7/1981 | Hanna | |
| 4,287,960 A | 9/1981 | McConnell | |
| 4,313,517 A | 2/1982 | Pivar | |
| D263,693 S | 4/1982 | Kaiser et al. | |
| 4,325,448 A | 4/1982 | Pivar | |
| 4,325,565 A | 4/1982 | Winchell | |
| 4,351,410 A | 9/1982 | Townsend | |
| 4,360,224 A * | 11/1982 | Sato et al. | 280/269 |
| 4,373,600 A | 2/1983 | Buschbom et al. | |
| 4,412,595 A | 11/1983 | Kinzel | |
| 4,423,795 A | 1/1984 | Winchell et al. | |
| 4,431,204 A | 2/1984 | Miyakoshi et al. | |
| 4,431,205 A | 2/1984 | Speicher et al. | |
| 4,433,851 A | 2/1984 | Miyakoshi et al. | |
| 4,437,535 A | 3/1984 | Winchell et al. | |
| 4,451,065 A | 5/1984 | Williams, Jr. | |
| 4,453,616 A | 6/1984 | Porter | |
| 4,453,763 A | 6/1984 | Richards | |
| 4,463,824 A | 8/1984 | Boyesen | |
| 4,465,156 A | 8/1984 | Richardson et al. | |
| 4,478,305 A | 10/1984 | Martin, II | |
| 4,484,648 A * | 11/1984 | Jephcott | 180/210 |
| 4,497,503 A | 2/1985 | Irwin | |
| D278,044 S | 3/1985 | Ohba | |
| 4,526,390 A | 7/1985 | Skolnik | |
| 4,531,606 A | 7/1985 | Watanabe | |
| 4,540,061 A | 9/1985 | Watanabe | |
| 4,546,997 A | 10/1985 | Smyers | |
| RE32,031 E | 11/1985 | Winchell | |
| 4,573,702 A | 3/1986 | Klem | |
| 4,582,157 A | 4/1986 | Watanabe | |
| 4,583,613 A | 4/1986 | Nakayama | |
| 4,588,196 A | 5/1986 | Williams, Jr. | |
| 4,592,441 A | 6/1986 | Marier et al. | |
| 4,600,216 A | 7/1986 | Burkholder | |
| 4,624,469 A | 11/1986 | Bourne, Jr. | |
| 4,632,210 A | 12/1986 | Yamamoto et al. | |
| 4,639,008 A | 1/1987 | Krettenauer et al. | |
| 4,660,853 A | 4/1987 | Jephcott | |
| 4,678,053 A | 7/1987 | Watanabe et al. | |
| 4,690,235 A | 9/1987 | Miyakoshi | |
| 4,691,799 A | 9/1987 | Watanabe | |
| 4,697,663 A | 10/1987 | Trautwein | |
| D292,565 S | 11/1987 | Badsey | |
| D294,686 S | 3/1988 | Ableidinger et al. | |
| D295,395 S | 4/1988 | Saito et al. | |
| 4,744,434 A | 5/1988 | Miyakoshi et al. | |
| 4,787,470 A | 11/1988 | Badsey | |
| 4,796,720 A | 1/1989 | Bauer | |
| 4,811,810 A | 3/1989 | Watanabe | |
| 4,886,149 A | 12/1989 | Uehara et al. | |
| 4,887,829 A * | 12/1989 | Prince | 280/282 |
| D305,745 S | 1/1990 | Hayata | |
| 4,903,857 A | 2/1990 | Klopfenstein | |
| 4,913,255 A | 4/1990 | Takayanagi et al. | |
| 4,921,263 A | 5/1990 | Patin | |
| 4,974,863 A | 12/1990 | Patin | |
| 4,998,596 A | 3/1991 | Miksitz | |
| 5,005,859 A | 4/1991 | Satoh et al. | |
| 5,039,121 A | 8/1991 | Holter | |
| 5,040,812 A | 8/1991 | Patin | |
| 5,116,069 A | 5/1992 | Miller | |
| 5,169,166 A * | 12/1992 | Brooks | 280/87.042 |
| 5,209,506 A | 5/1993 | Klopfenstein | |
| 5,238,261 A | 8/1993 | Ogiso | |
| 5,240,267 A | 8/1993 | Owsen | |
| 5,244,190 A | 9/1993 | Bianchi | |
| 5,257,671 A | 11/1993 | Watkins | |
| D344,914 S | 3/1994 | McNutt | |
| 5,343,974 A | 9/1994 | Rabek | |
| 5,360,078 A | 11/1994 | Rifenburg et al. | |
| 5,383,683 A | 1/1995 | Hufgard | |
| 5,487,443 A | 1/1996 | Thurm | |
| 5,499,689 A | 3/1996 | Johnson | |
| 5,529,141 A | 6/1996 | Lehman et al. | |
| 5,580,089 A | 12/1996 | Kolka | |
| 5,591,282 A | 1/1997 | Weber et al. | |
| 5,611,555 A | 3/1997 | Vidal | |
| D384,626 S | 10/1997 | Lehman et al. | |
| D386,469 S | 11/1997 | Lehman et al. | |
| 5,692,577 A | 12/1997 | Dornbusch et al. | |
| 5,727,864 A * | 3/1998 | Stelling et al. | 362/473 |
| 5,762,351 A | 6/1998 | SooHoo | |
| 5,765,846 A | 6/1998 | Braun | |
| 5,785,141 A | 7/1998 | Breitkreutz et al. | |
| 5,806,622 A | 9/1998 | Murphy | |
| 5,810,383 A | 9/1998 | Anderson | |
| D404,688 S | 1/1999 | Hanagan et al. | |
| 5,884,717 A | 3/1999 | Lehman et al. | |
| 5,899,291 A | 5/1999 | Dumais | |
| 5,927,424 A | 7/1999 | Van Den Brink et al. | |
| 5,941,548 A | 8/1999 | Owsen | |
| 5,960,901 A | 10/1999 | Hanagan | |
| 5,975,225 A | 11/1999 | Kamen et al. | |
| 6,003,880 A | 12/1999 | Kokotovic | |
| D424,979 S | 5/2000 | Hanagan et al. | |
| 6,062,581 A | 5/2000 | Stites | |
| D427,943 S | 7/2000 | Lehman et al. | |
| D433,656 S | 11/2000 | Hanagan et al. | |
| 6,158,279 A * | 12/2000 | Saiki | 73/493 |
| 6,164,675 A | 12/2000 | Pickering | |
| 6,169,939 B1 | 1/2001 | Raad et al. | |
| 6,170,838 B1 | 1/2001 | Laurent et al. | |
| 6,206,124 B1 | 3/2001 | Mallette et al. | |
| 6,250,649 B1 | 6/2001 | Braun | |
| 6,257,362 B1 * | 7/2001 | Scherbarth | 180/219 |
| D446,760 S | 8/2001 | Turgeon et al. | |
| 6,273,003 B1 | 8/2001 | Benker et al. | |
| 6,276,480 B1 | 8/2001 | Aregger | |
| 6,328,125 B1 | 12/2001 | Van Den Brink et al. | |
| 6,390,219 B1 | 5/2002 | Vaisanen | |
| 6,406,036 B1 | 6/2002 | Laurent et al. | |
| D461,438 S | 8/2002 | Turgeon | |
| 6,435,522 B1 | 8/2002 | Van Den Brink et al. | |
| 6,464,030 B1 | 10/2002 | Hanagan et al. | |
| 6,467,561 B1 | 10/2002 | Boiyin et al. | |
| 6,478,098 B2 | 11/2002 | Boiyin et al. | |
| 6,488,111 B1 | 12/2002 | McKenna et al. | |
| 6,491,122 B2 | 12/2002 | Leitner et al. | |
| 6,498,967 B1 | 12/2002 | Hopkins et al. | |
| 6,499,751 B1 | 12/2002 | Beleski, Jr. | |
| 6,511,078 B2 | 1/2003 | Sebe | |
| 6,523,634 B1 | 2/2003 | Gagnon et al. | |
| 6,533,309 B2 | 3/2003 | Lin | |
| 6,540,243 B2 | 4/2003 | Takayanagi et al. | |

| | | | | | |
|---|---|---|---|---|---|
| 6,547,027 B1 * | 4/2003 | Kalhok et al. ............... 180/312 | 6,948,581 B2 | 9/2005 | Fecteau et al. |
| 6,547,260 B2 | 4/2003 | Laurent et al. | 6,976,687 B2 | 12/2005 | Beleski, Jr. |
| 6,550,797 B2 | 4/2003 | Wagner | 7,007,761 B1 | 3/2006 | Johnson, IV |
| 6,554,302 B1 | 4/2003 | Liu | 7,017,685 B2 | 3/2006 | Schoenberg |
| 6,556,907 B1 | 4/2003 | Sakai | 7,029,014 B2 | 4/2006 | Hamm |
| D474,431 S | 5/2003 | Hyndman et al. | 7,055,993 B2 * | 6/2006 | Farrow et al. ............... 362/469 |
| 6,572,130 B2 | 6/2003 | Greene, Jr. et al. | 7,073,806 B2 | 7/2006 | Bagnoli |
| 6,575,260 B2 | 6/2003 | Bourget | 7,090,234 B2 | 8/2006 | Takayanagi et al. |
| 6,588,785 B2 | 7/2003 | Monary | D528,475 S | 9/2006 | Strilchuk et al. |
| 6,595,531 B2 | 7/2003 | de Oliveira | 7,100,727 B2 | 9/2006 | Patin et al. |
| 6,601,862 B2 | 8/2003 | Kettler | 7,131,650 B2 | 11/2006 | Melcher |
| 6,607,201 B2 | 8/2003 | Marshburn | 7,143,853 B1 | 12/2006 | Mercier et al. |
| D479,160 S | 9/2003 | Hyndman et al. | 7,343,997 B1 * | 3/2008 | Matthies ............... 180/215 |
| 6,612,389 B1 | 9/2003 | Bell | 7,416,046 B2 * | 8/2008 | Aube et al. ............... 180/312 |
| 6,622,806 B1 * | 9/2003 | Matsuura ............... 180/68.1 | 7,485,984 B2 * | 2/2009 | Fulks et al. ............... 307/10.1 |
| 6,626,260 B2 | 9/2003 | Gagnon et al. | 2003/0102176 A1 | 6/2003 | Bautista |
| 6,655,705 B2 | 12/2003 | Turgeon | 2003/0174493 A1 * | 9/2003 | Kinouchi ............... 362/43 |
| 6,659,488 B1 | 12/2003 | Beresnitzky et al. | 2003/0188906 A1 | 10/2003 | Bank |
| D485,514 S | 1/2004 | Berg | 2004/0035623 A1 | 2/2004 | Fecteau et al. |
| D485,788 S | 1/2004 | Guay et al. | 2004/0035624 A1 | 2/2004 | Fecteau et al. |
| 6,672,602 B2 | 1/2004 | Way, II et al. | 2004/0035625 A1 | 2/2004 | Talbot et al. |
| 6,676,146 B2 | 1/2004 | Boyd | 2004/0036250 A1 | 2/2004 | Kofuji |
| 6,688,620 B2 | 2/2004 | Serra et al. | 2004/0072479 A1 | 4/2004 | Roycroft |
| 6,705,674 B1 | 3/2004 | McMahan et al. | 2004/0094350 A1 | 5/2004 | Bogatay et al. |
| 6,708,579 B2 | 3/2004 | Punko | 2004/0100059 A1 | 5/2004 | Van Den Brink et al. |
| 6,719,319 B2 | 4/2004 | Liao | 2004/0129473 A1 | 7/2004 | Talbot et al. |
| 6,732,830 B2 | 5/2004 | Gagnon et al. | 2004/0140644 A1 | 7/2004 | Kofuji et al. |
| 6,734,645 B2 | 5/2004 | Auerbach | 2004/0173981 A1 | 9/2004 | Patin et al. |
| 6,739,616 B2 | 5/2004 | Lin | 2004/0227318 A1 | 11/2004 | Beleski, Jr. |
| 6,742,797 B2 | 6/2004 | Lopez | 2004/0227321 A1 | 11/2004 | Kuroki et al. |
| 6,761,241 B2 | 7/2004 | Kohda | 2005/0012291 A1 * | 1/2005 | Bagnoli ............... 280/124.103 |
| 6,763,905 B2 | 7/2004 | Cocco et al. | 2005/0039967 A1 | 2/2005 | Aube et al. |
| 6,764,099 B2 | 7/2004 | Akiyama et al. | 2005/0072613 A1 | 4/2005 | Maltais et al. |
| 6,766,876 B2 | 7/2004 | Ozeki et al. | 2005/0099818 A1 * | 5/2005 | Gropp et al. ............... 362/466 |
| 6,783,158 B2 | 8/2004 | Nakagawa et al. | 2005/0109552 A1 | 5/2005 | Nakabayashi et al. |
| 6,793,033 B2 | 9/2004 | Yamazaki et al. | 2005/0205320 A1 | 9/2005 | Girouard et al. |
| 6,805,362 B1 | 10/2004 | Melcher | 2005/0205321 A1 | 9/2005 | Girouard et al. |
| 6,817,617 B2 * | 11/2004 | Hayashi ............... 280/5.509 | 2005/0205322 A1 | 9/2005 | Girouard et al. |
| 6,827,358 B2 | 12/2004 | Beleski, Jr. | 2005/0217909 A1 | 10/2005 | Guay et al. |
| 6,851,691 B2 | 2/2005 | Rasidescu et al. | 2005/0236791 A1 | 10/2005 | Carr |
| D502,431 S | 3/2005 | Matthies | 2005/0236803 A1 | 10/2005 | Summers et al. |
| D502,893 S | 3/2005 | Matthies | 2005/0279244 A1 | 12/2005 | Bose |
| D502,894 S | 3/2005 | Matthies | 2006/0054370 A1 | 3/2006 | Sugioka et al. |
| D502,895 S | 3/2005 | Matthies | 2006/0065463 A1 | 3/2006 | Handa et al. |
| 6,863,288 B2 | 3/2005 | Van Den Brink et al. | 2006/0065464 A1 | 3/2006 | Kofuji |
| 6,866,110 B2 | 3/2005 | Mallette et al. | 2006/0086555 A1 | 4/2006 | Dower |
| 6,871,718 B2 | 3/2005 | McGuire | 2006/0097471 A1 | 5/2006 | Van Den Brink et al. |
| 6,874,793 B2 | 4/2005 | Choudhery | 2006/0151232 A1 | 7/2006 | Marcacci |
| 6,880,840 B2 | 4/2005 | Chuang | 2006/0180372 A1 | 8/2006 | Mercier et al. |
| 6,883,814 B2 | 4/2005 | Chuang | 2006/0249921 A1 | 11/2006 | Patin et al. |
| 6,886,842 B2 | 5/2005 | Vey et al. | 2006/0254842 A1 | 11/2006 | Dagenais et al. |
| 6,908,090 B2 | 6/2005 | Chuang | 2006/0255550 A1 * | 11/2006 | Pfeil et al. ............... 280/5.509 |
| 6,908,091 B2 | 6/2005 | Chuang | 2006/0273655 A1 | 12/2006 | Mercier et al. |
| 6,908,092 B2 | 6/2005 | Kofuji et al. | | | |
| 6,945,832 B2 | 9/2005 | Roycroft | * cited by examiner | | |

HEADLIGHT MOUNTING ARRANGEMENT

RELATED APPLICATIONS

Priority is hereby claimed to U.S. Provisional Patent Application No. 60/722,115 filed on Sep. 30, 2005, the entire content of which is incorporated herein by reference.

BACKGROUND

The present invention relates to vehicles with leaning suspension systems. In particular, the present invention relates to a headlight mounting arrangement for vehicles with leaning suspension systems.

SUMMARY

The present invention provides a vehicle including a frame, at least one wheel operable to contact a substantially horizontal support surface, a suspension system operable to maintain the frame in an upright position while driving along a straight path and to permit the frame to lean relative to the support surface while cornering, and at least one headlight coupled to the suspension system and arranged in a substantially horizontal configuration, wherein the headlight remains in the substantially horizontal configuration when the frame is in the upright position and when the frame is leaning.

The present invention further provides a vehicle including a leaning suspension system. The vehicle further includes a frame defining a longitudinal vehicle axis, at least one wheel rotatably coupled to the frame, a suspension system including a substantially horizontal transverse beam connected to the frame and pivotable about the vehicle axis, and first and second lean actuators pivotably connected between the frame and the transverse beam, the first and second actuators actuable to lean the vehicle while cornering. The vehicle further includes at least one headlight supported by the transverse beam.

The present invention further provides a vehicle including a frame, at least one wheel operable to contact a substantially horizontal support surface, a suspension system, and at least one headlight. The suspension system is operable to maintain the frame in an upright position while driving along a straight path and to permit the frame to lean relative to the support surface while cornering. The headlight is coupled to the suspension system and arranged in a first orientation when the frame is in the upright position while driving along a straight path. The headlight leans an angle relative to the first orientation while cornering. The angle of the lean of the headlight is less than the angle of the lean of the frame while cornering.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
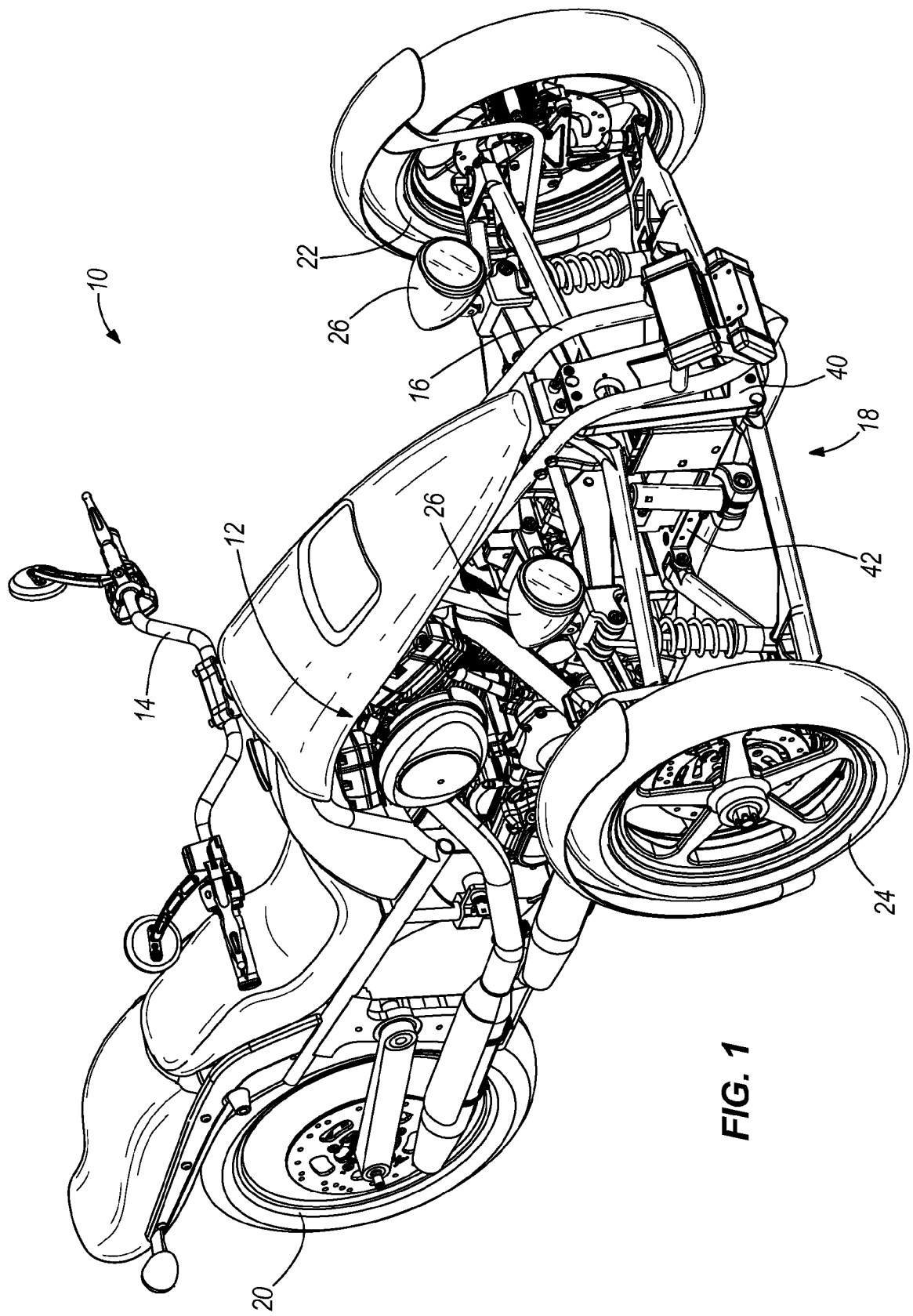
FIG. 1 is a perspective view of a three-wheeled motorcycle including a leaning front suspension and a headlight mounting arrangement embodying the present invention.
Figure 2:
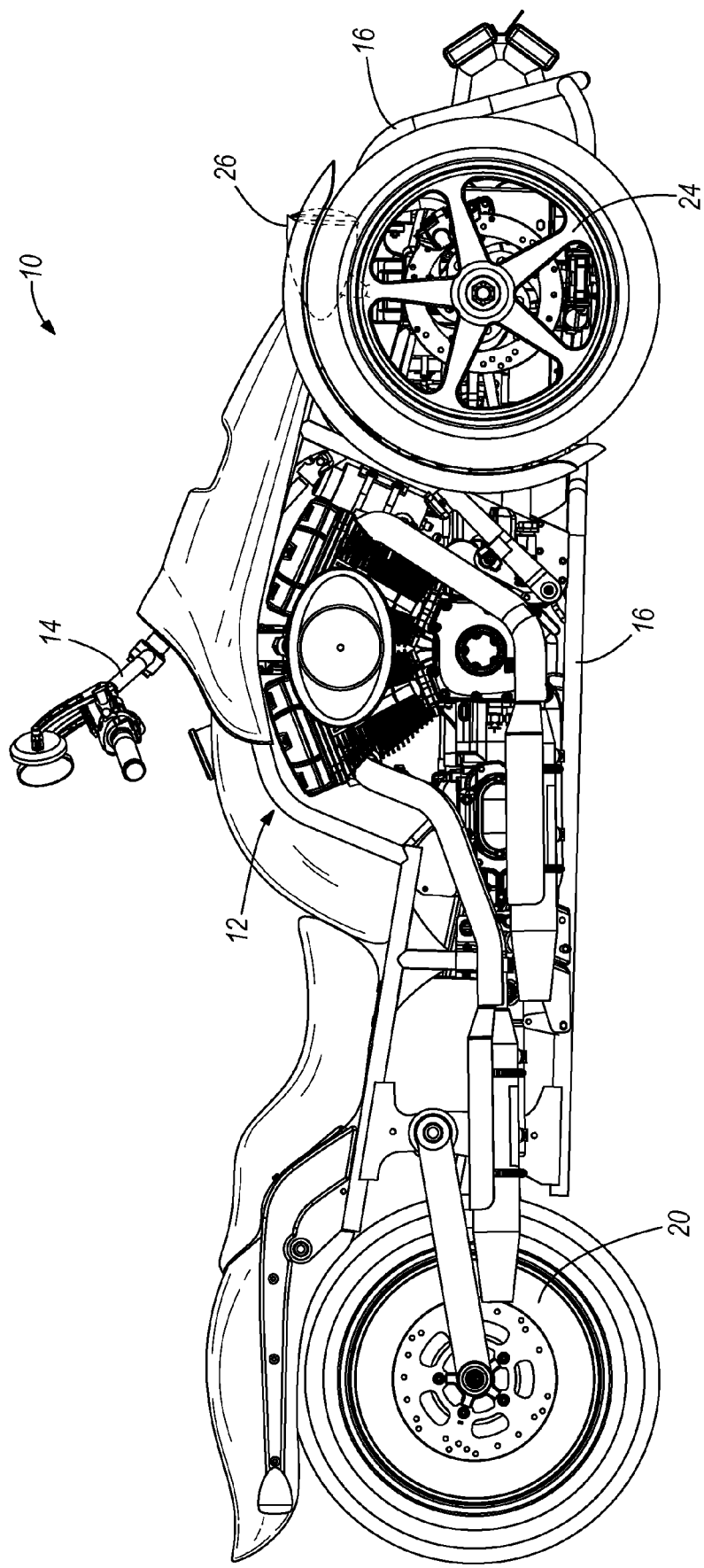
FIG. 2 is a side view of the three-wheeled motorcycle of FIG. 1.

FIGS. 1 and 2 illustrate a three-wheeled motorcycle or trike 10 having an engine 12, handlebars 14, a frame 16, a single rear wheel 20, first and second front wheels 22, 24, and headlights 26. The rear wheel 20 is rotatably mounted to a rear portion of the frame 16, and the front wheels 22, 24 are coupled to the frame 16 via a leaning suspension system 18. The frame 16 includes a front bulkhead 40 and a main bulkhead 42 defining the front portion of the frame 16. The front bulkhead 40 is connected to the main bulkhead 42 to stiffen and strengthen the entire suspension system 18. The engine 12 is coupled to the rear wheel 20 through a drive assembly (not shown) to propel the trike 10. The handlebars 14 are pivotally coupled to the front portion of the frame 16 and coupled to the front wheels 22, 24 through a steering system to controllably turn the front wheels 22, 24.

The illustrated embodiment is for a trike 10 having two steerable front wheels 22, 24 and a single, driven rear wheel 20. It should be noted that it is within the scope of the invention to employ the suspension of the present invention in a vehicle having two rear wheels and a single front wheel. Also, in other embodiments, the suspension can be used for the front wheel, the rear wheels, or both the front and rear wheels in a vehicle having four wheels, such as an ATV.

Figure 3:
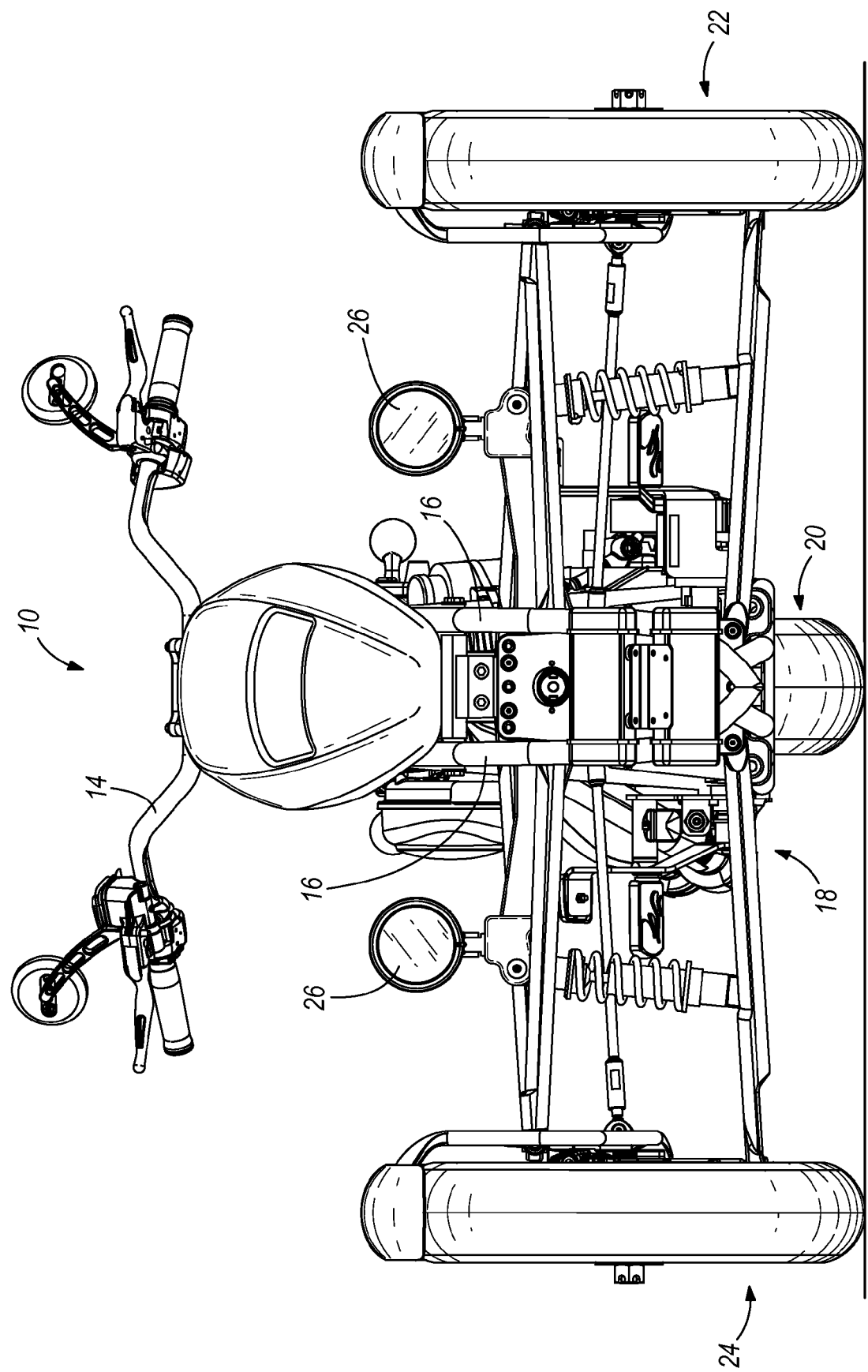
FIG. 3 is a front view of the three-wheeled motorcycle of FIG. 1, illustrating the three-wheeled motorcycle in an upright position.
Figure 4:
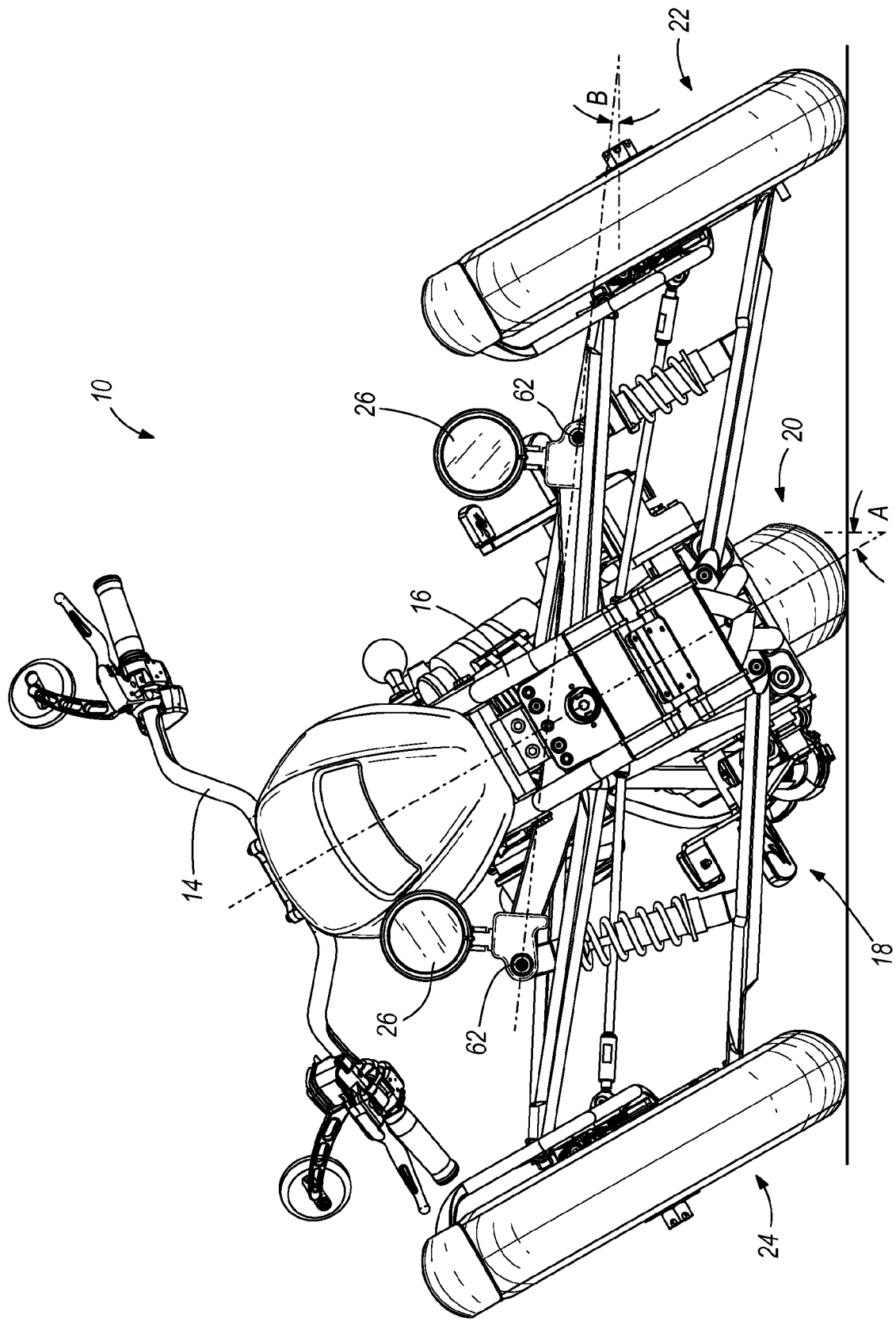
FIG. 4 is a front view of the three-wheeled motorcycle of FIG. 1, illustrating the three-wheeled motorcycle in a leaning position.

FIG. 3 illustrates a front view of the trike 10 of FIG. 1, showing the leaning suspension system 18 in an upright position. This position illustrates the orientation of the suspension system 18 while the trike 10 tracks a straight line on a flat surface. FIG. 4 illustrates the same front view of the trike 10 as FIG. 3, but in a leaning configuration. This view shows how the suspension system 18 is oriented when the trike 10 is turning, or tracking an arcuate path. It should be noted that in order to highlight the different positions of the suspension system 18 between FIGS. 3 and 4, the handlebar 14 and wheel 22, 24 positions are illustrated in the same, center, straightforward position for both FIGS. 3 and 4. Although this position is correctly illustrated in FIG. 3, the handlebar 14 position and the wheel 22, 24 positions in FIG. 4 should be pivoted and turned, respectively, toward or into the direction of the turn.

Figure 5:
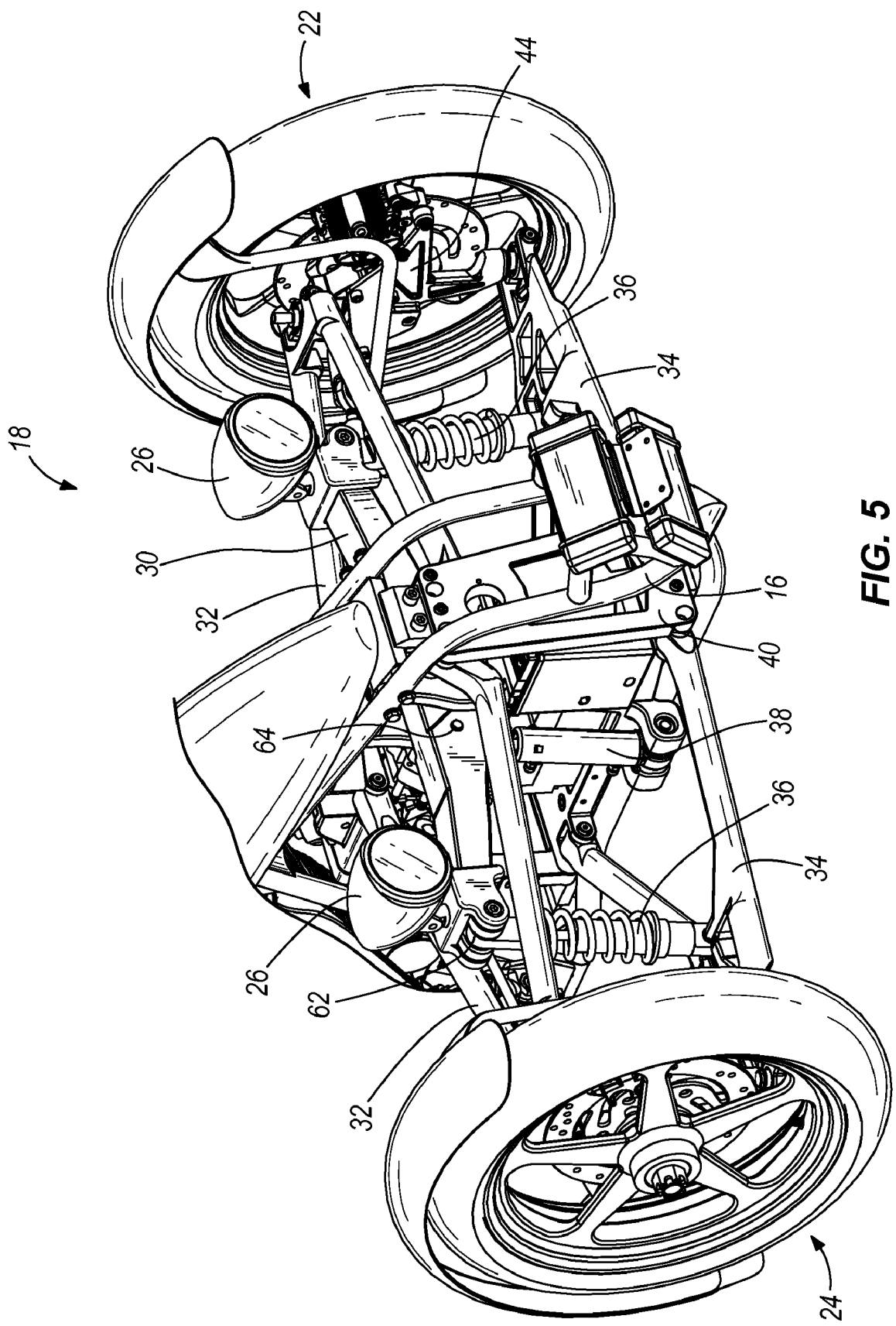
FIG. 5 is an enlarged perspective view of the front suspension of the three-wheeled motorcycle of FIG. 1.
Figure 6:
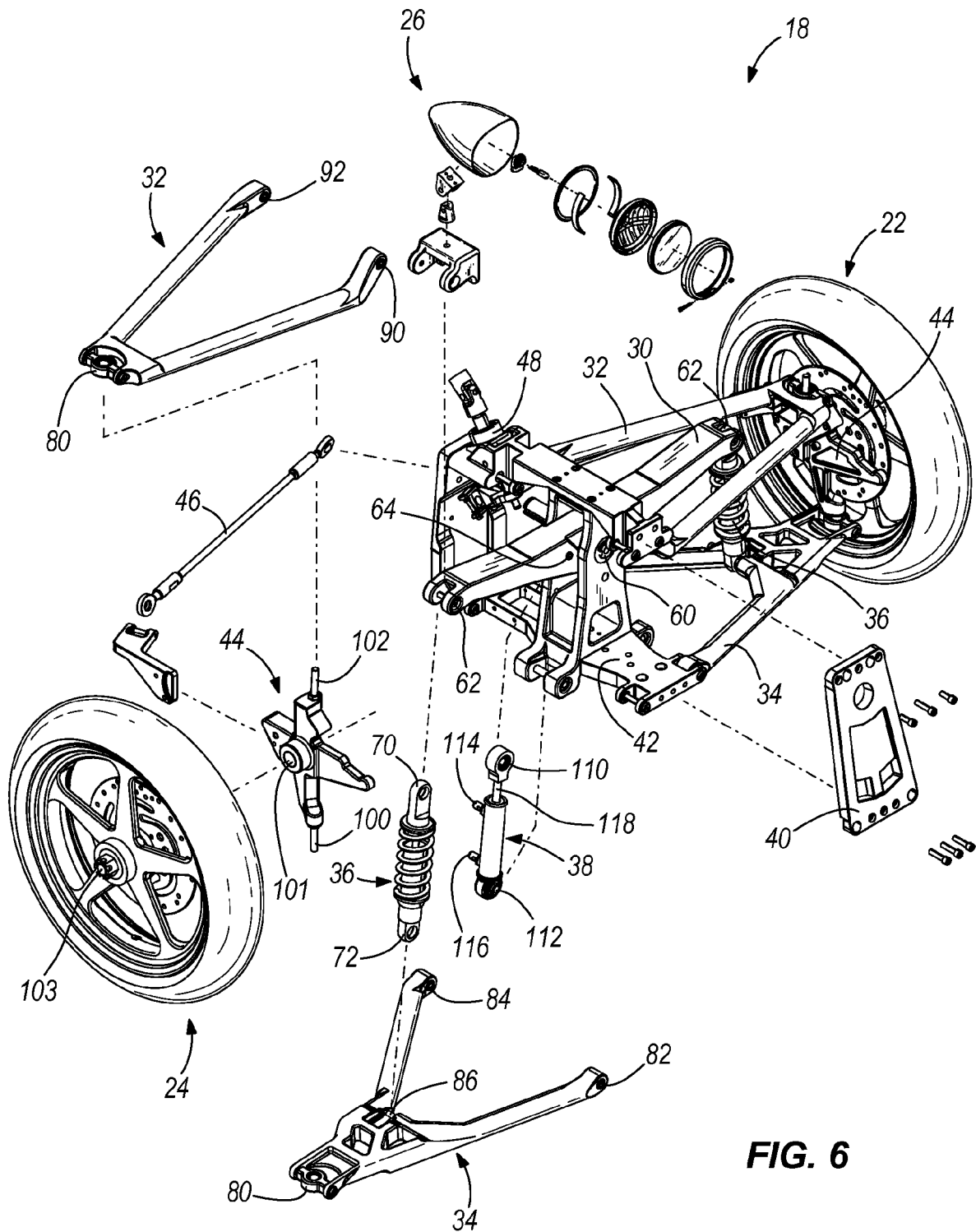
FIG. 6 is an exploded perspective view of the front suspension of the three-wheeled motorcycle of FIG. 1.

Referring to FIGS. 5 and 6, the leaning suspension system 18 includes a transverse beam 30, upper control arms 32, lower control arms 34, spring dampers 36, hydraulic actuators 38, and spindles 44. The spindles 44 each include upper and lower pins 102, 100, as well as means for rotatably coupling to one of the front wheels 22, 24, such as a hole 101 for receiving a wheel axle 103. The structure of the spindle 44 is well known to those skilled in the art.

The transverse beam 30 is rigid and remains substantially horizontal during operation of the trike 10. The transverse beam 30 has a center pivot point 60, end pivot points 62, and intermediate pivot points 64. The transverse beam 30 is pivotally coupled to the main bulkhead 42 at the center pivot 60. The center pivot 60 is positioned to coincide with the longitudinal centerline of the trike 10 and defines a pivot axis that is parallel to the vehicle centerline. The end pivot points 62 are pivotally coupled to upper pivots 70 on the spring dampers 36.

With reference to FIGS. 3 and 4, the vehicle lean angle A and the pivot angle B of the substantially horizontal transverse beam 30 are illustrated. As shown in FIG. 4, the transverse beam 30 defines a line between its pivot points 62, and this line defines the pivot angle B relative to the horizontal riding surface. In FIG. 3, the vehicle is upright (i.e., a lean angle A of 0 degrees) and the transverse beam 30 is horizontal (i.e., parallel to the horizontal riding surface with a pivot angle B of 0 degrees). In FIG. 4, the vehicle is leaning to the right approximately 30 degrees with respect to vertical (i.e, a lean angle A of 30 degrees), and the transverse beam 30 remains substantially horizontal while pivoting only approximately 5 degrees relative to horizontal (i.e., pivot angle B of 5 degrees). As used herein, the transverse beam 30 is said to be substantially horizontal when the pivot angle B is less than 10 degrees relative to horizontal, more specifically less than 5 degrees relative to horizontal, and even more specifically less than 3 degrees relative to horizontal.

The lower control arms 34 have trunnions 80 rotatably coupled to one end and adapted to rotatably receive the lower pin 100 on the spindles 44. These trunnions 80 allow the suspension to operate independent of wheel steering by permitting the spindles 44 to pivot and turn regardless of the position of the lower control arms 34. The two remaining ends of the lower control arms 34 include front and rear pivot points 82, 84 that are pivotally connected to the main bulkhead 42. A central pivot 86 is located centrally on the lower control arms 34 and is adapted to pivotally couple to lower pivot points 72 on the spring dampers 36.

The upper control aims 32 also have trunnions 80 rotatably coupled to one end and adapted to rotatably receive the upper pin 102 on the spindles 44. These trunnions 80 allow the suspension to operate independent of wheel steering. The two remaining ends of the upper control arms 32 include front and rear pivot points 90, 92 that are pivotally connected to the main bulkhead 42.

In the illustrated embodiment, the transverse beam 30 is positioned between the front and real pivots 90, 92 on the upper control arms 32. In other embodiments, the transverse beam 30 could he positioned in front of the front pivots 90, behind the rear pivots 92, or coupled to a different location than the upper control arms 32 (i.e. coupled to a different bulkhead).

As mentioned above, the spring dampers 36 include upper and lower pivot points 70, 72 connecting the transverse beam 30 to the lower control arms 34. The spring dampers 36 include a shock absorbing member surrounded by a biasing member. This style of spring damper 36 is well known to those skilled in the art, and will not be discussed in further detail. Alternative embodiments may utilize a different method of biasing and shock absorbing, such as leaf springs, coil springs, or air springs.

The hydraulic actuators 38 include upper and lower pivot points 110, 112. The illustrated embodiment shows the upper pivot points 110 of the hydraulic actuators 38 are pivotally coupled to the intermediate pivot points 64 on the transverse beam 30 at a location between the center pivot point 60 and one of the end pivot points 62. Other embodiments could include the hydraulic actuators 38 pivotally coupled to the end pivot points 62 and the spring damper 36 pivotally coupled to the transverse beam 30 at a location between the center pivot point 60 and one of the end pivot points 62. The hydraulic actuators 38 and spring dampers can also be pivotally coupled to other points along the transverse beam 30.

The hydraulic actuators 38 shown in the illustrated embodiment include a cylinder having top and bottom fluid ports 114, 116. A piston (not shown) exists at the end of a shaft 118 within each cylinder. When hydraulic fluid is forced into the top fluid port 114 by a hydraulic pump (not shown), the internal piston is forced down, and the shaft 118 retracts. While this is happening, hydraulic fluid is being forced out of the bottom fluid port 116 and into a reservoir (not shown). When hydraulic fluid is forced into the bottom fluid port 116, the internal piston is forced up, and the shaft 118 extends. While this is happening, hydraulic fluid is being forced out of the top fluid port 114 and into the reservoir.

The hydraulic actuators 38 act to control the vertical orientation of the trike 10. When entering a turn, one of the hydraulic actuators 38 extends in length while the other retracts, moving the trike 10 into a leaning position as illustrated in FIG. 4. When the trike 10 is leaving the turn, the hydraulic actuators 38 act to bring the trike 10 back to a vertical orientation as illustrated in FIG. 3. The hydraulic actuators are controlled by a leaning suspension control system that monitors at least one characteristic of the trike such as handlebar position (i.e., steering angle), speed, acceleration, etc. Safety features can be present to ensure the trike 10 is returned to the vertical orientation when the engine 12 is turned off, or if there is a malfunction in the control of the hydraulic system.

The substantially horizontal orientation of the transverse beam 30 is maintained by the influence of the spring dampers 36. The lower control arms 34 are connected to the front wheels 22, 24 through the spindles 44 and to the transverse beam 30 by the spring dampers 36. The front wheels 22, 24, and thus the lower control arms 34, remain substantially parallel to the road during normal operation. The road is generally substantially planar for the width of the trike 10 meaning that as long as both front wheels 22, 24 are in contact with the road, whether cornering or tracking a straight line, the spring dampers 36 will bias the transverse beam 30 to a position that is substantially parallel to the road. The hydraulic actuators 38 connect the frame 16 to the transverse beam 30, and control the lean of the trike 10. As the hydraulic actuators 38 extend, they push the frame 16 away from the transverse beam 30, initiating lean. The biasing force from the spring dampers 36 acting on the transverse beam creates a larger moment about the central pivot 86 than the hydraulic actuators 38, so extension of the hydraulic actuators 38 moves the frame 16 with respect to the beam 30.

The steering system includes spindles 44, tie rods 46, and the steering box 48. The handlebars 14 are coupled to the steering box 48 such that when an operator turns the handlebars 14, an output shaft (not shown) on the steering box 48 rotates. The output shaft is pivotally coupled to a first end of each tie rod 46. The second end of each tie rod 46 is pivotally coupled to one of the spindles 44. As the output shaft on the steering box 48 rotates, the tie rods 46 follow, pulling one spindle 44 and pushing the other. The spindles 44 are rotatably coupled to the upper and lower control arms 32, 34 by upper and lower pins 102, 100. Thus the pushing or pulling action initiated by the tie rods 46 causes the spindles 44, and thus the front wheels 22, 24, to rotate about the upper and lower pins 102, 100.

Using hydraulic actuators 38 as discussed affords some major advantages to trikes. First, since the lean of the trike 10 is controlled by the hydraulic actuators 38, the upper and lower control arms 32, 34, spring dampers 36, and steering components are free to act normally, regardless of the trike's 10 lean. This allows the trike 10 to absorb bumps while tracking an arcuate path in the same manner it would if it were tracking a straight line, making for a consistent suspension action, even while turning.

Figure 7:
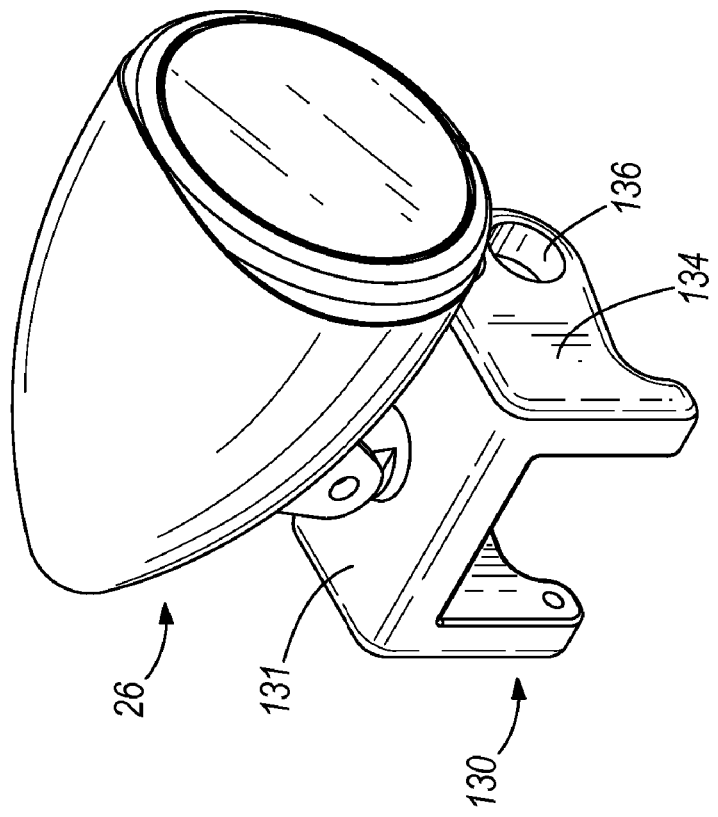
FIG. 7 is a perspective view of the headlights and mounting brackets of FIG. 1.
Figure 7:
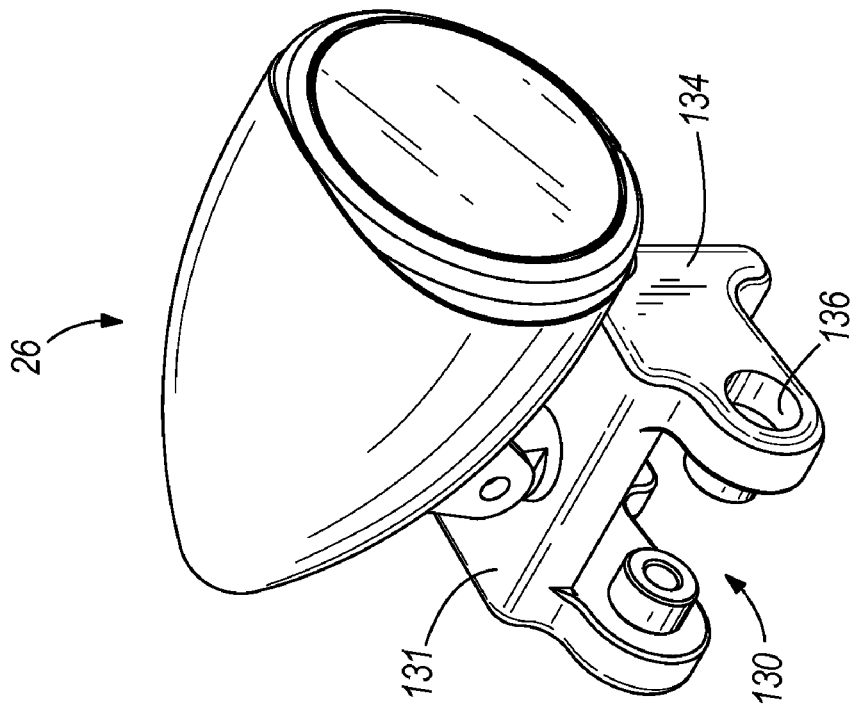
Figure 8:
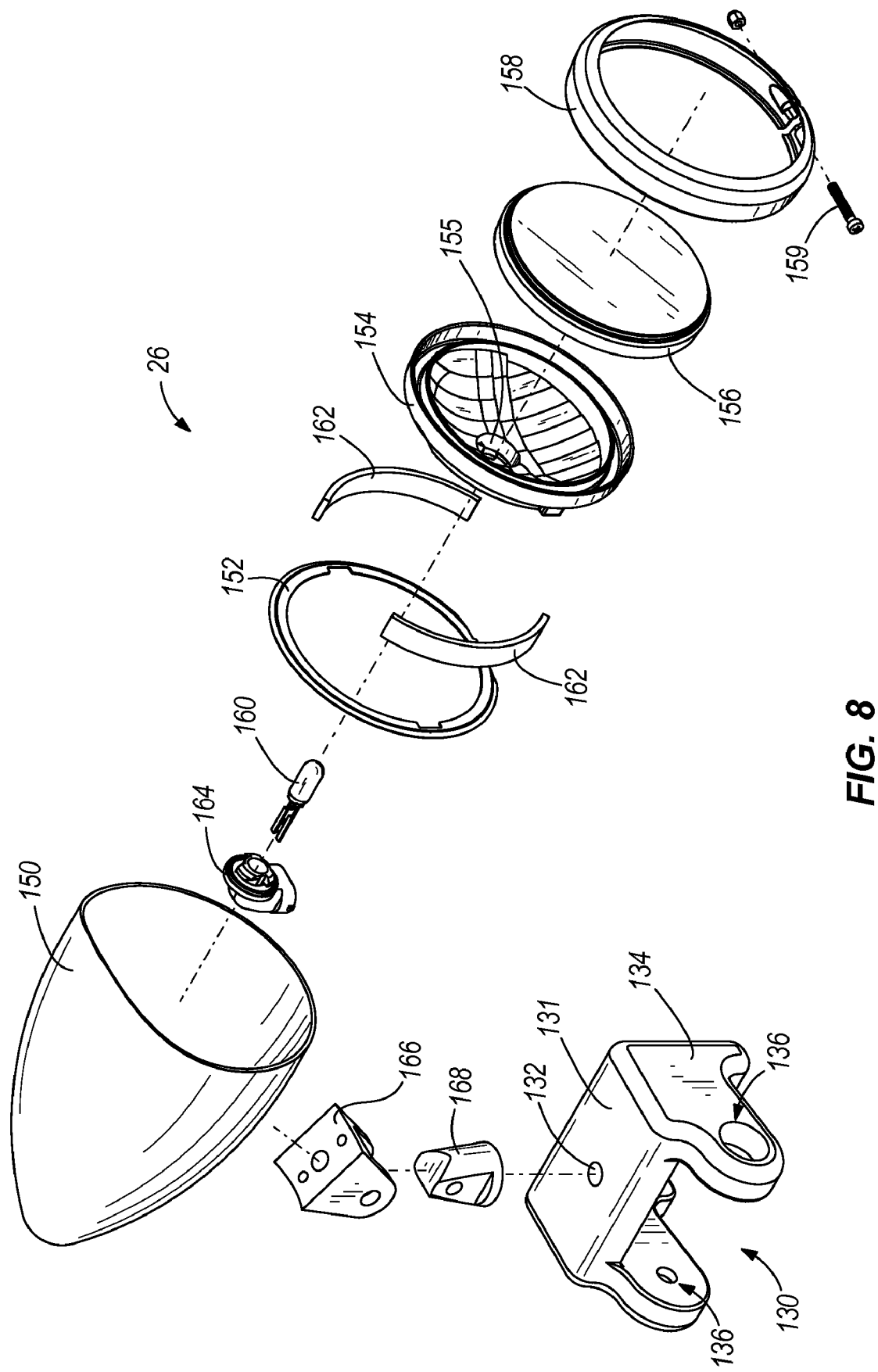
FIG. 8 is an exploded perspective view of the headlight mounting arrangement of FIG. 7.

Referring to FIGS. 7 and 8, the headlight bracket 130 includes a top surface 131 that defines an aperture 132, and matching front and rear surfaces 134 defining apertures 136 that include counter bores. The headlight bracket 130 defines a space between the front and rear surfaces 134 allowing the headlight bracket 130 to straddle an end of the transverse beam 30. The apertures 136 allow the headlight bracket 130 to be coupled to the transverse beam by threading a fastener (not shown) through the apertures 136, the transverse beam 30, and the upper pivot point 70 of the spring damper 36. This fastener defines the end pivot points 62 at each end of the transverse beam 30.

The headlight 26 includes a housing 150, a retaining ring 152, a reflective portion 154, a lens 156, and a trim ring 158. The retaining ring 152 is of a diameter slightly less than that of the interior of the housing 150, and is intended to be positioned within the housing 150 where it will fit to a predetermined depth. At this depth, the retaining ring 152 could be held in place by tabs (not shown) protruding from the inside of the housing 150, or by a friction fit.

The reflective portion 154 is concave in shape, and is also of a diameter slightly less than that of the interior of the housing 150. An aperture 155 is defined by and is located substantially in the center of the reflective portion 154. The aperture 155 is adapted to receive a bulb 160. A boot 164 is adapted to receive the bulb and provide a seal for wires to leave the housing. When the bulb 160 is positioned within the aperture 155 and connected to a power source the reflective portion 154 will direct most of the generated light into a beam in a forward direction. The reflective portion 154 is positioned in the housing 150, and rests against spacers 162 that are in abutment with the retaining ring 152.

The lens 156 is generally disk-shaped and is made of a clear material such as plastic or glass. The diameter of the lens 156 is slightly smaller than the inner diameter of the reflective portion 154. This allows the lens 156 to be positioned inside of the reflective portion, where it can protect the bulb 160 while still allowing the light generated by the bulb 160 to be transmitted.

The trim ring 158 includes a break and a fastener 159 joining the two ends of the trim ring 158. The inner surface of the trim ring 158 has a concave shape with the front and rear edges extending towards the center of the trim ring 158. When assembled, the front and rear edges of the trim ring 158 will surround the reflective portion 154 and the lens 156. Tightening the fastener 159 will decrease the diameter of the trim ring 158 and hold the reflective portion 154 and the lens 156 together.

The housing 150 is adapted to couple to the top surface 131 of the headlight bracket 130. This is accomplished via a mounting block 166 and a mounting pivot 168. The mounting block 166 can be coupled to the housing 150 by any suitable fastener. A fastener (not shown) can be threaded into the mounting pivot 168 through the aperture 132 defined by the top surface 131 of the headlight bracket 130. The mounting block 166 is coupled to the mounting pivot by means of a pin or any suitable fastener (not shown). These fasteners are ideally of the locking variety, which can allow rotation of the mounting pivot 168 with respect to the mounting bracket 130, and rotation of the mounting block 166 with respect to the mounting pivot 168, while still holding the pieces tightly together. This affords both rotation and tilting of the headlights 26 to aim them.

As mentioned above, the transverse beam 30 remains substantially horizontal, even when the trike 10 is leaning. By coupling the headlights 26 to the transverse beam 30, they also will main substantially horizontal. This provides an operator of the trike 10 with consistent lighting while in motion, including while cornering, focuses the headlight on the road directly in front of the trike 10, and reduces glare for oncoming motorists.

What is claimed is:

1. A vehicle comprising:
a frame;
at least one wheel operable to contact a substantially horizontal support surface;
a suspension system operable to maintain the frame in an upright position while driving along a straight path and to permit the frame to lean relative to the support surface while cornering; and
at least one headlight mounted on the suspension system and arranged in a substantially horizontal configuration, wherein the headlight remains in the substantially horizontal configuration when the frame is in the upright position and when the frame is leaning.

2. The vehicle of claim 1, wherein the suspension system includes a substantially horizontal transverse beam pivotally connected to the frame and first and second lean actuators pivotably connected between the frame and the transverse beam, the first and second actuators actuable to lean the vehicle while cornering, and wherein the transverse beam remains substantially horizontal when the vehicle leans.

3. The vehicle of claim 2, wherein the at least one headlight is supported by the transverse beam.

4. The vehicle of claim 2, wherein the suspension system further includes at least two control arms pivotably connected to the frame and extending from the frame in substantially opposite directions.

5. The vehicle of claim 4, further comprising at least two damping members pivotably supported at a first end by the control arms and pivotably supported at a second end by pivot members extending through the transverse beam.

6. The vehicle of claim 5, further comprising a headlight bracket for supporting the headlight, the headlight bracket being supported by the transverse beam and including an aperture through which the pivot member extends.

7. The vehicle of claim 1, further comprising two front wheels, and wherein the at least one wheel is a single rear wheel.

8. A vehicle comprising:
a frame;

at least one wheel rotatably coupled to the frame and operable to contact a substantially horizontal support surface;

a suspension system operable to maintain the frame in an upright position while driving along a straight path and to permit the frame to lean relative to the support surface while cornering, the suspension system including a transverse beam pivotally coupled to the frame; and at least one headlight having a substantially horizontal orientation when the frame is in the upright position and maintaining the substantially horizontal orientation when the frame is leaned while cornering, the orientation of the at least one headlight relative to the transverse beam of the suspension system being substantially unchanged when the frame is leaned from the upright position while cornering.

9. The vehicle of claim 8, wherein the at least one headlight is mounted on the transverse beam.

10. The vehicle of claim 9, wherein the suspension system further includes at least two control arms pivotally connected to the frame and extending from the frame in substantially opposite directions, and first and second lean actuators pivotably connected between the frame and the transverse beam, the first and second lean actuators actuable to lean the vehicle while cornering.

11. The vehicle of claim 10, further comprising at least two damping members pivotably supported at a first end by the control arms and pivotably supported at a second end by pivot members extending through the transverse beam.

12. The vehicle of claim 11, further comprising a headlight bracket for supporting the headlight, the headlight bracket being supported by the transverse beam and including an aperture through which the pivot member extends.

13. The vehicle of claim 8, further comprising two front wheels, and wherein the at least one wheel is a single rear wheel.

14. A vehicle comprising:
a frame;
at least one wheel operable to contact a substantially horizontal support surface;

a suspension system operable to maintain the frame in an upright position while driving along a straight path and to permit the frame to lean relative to the support surface while cornering; and at least one headlight mounted on the suspension system and arranged in a first orientation when the frame is in the upright position while driving along a straight path, wherein the headlight leans at an angle relative to the first orientation while cornering, and wherein the angle of the lean of the headlight is less than the angle of the lean of the frame while cornering.

15. The vehicle of claim 14, wherein the suspension system includes a substantially horizontal transverse beam pivotally connected to the frame and first and second lean actuators pivotably connected between the frame and the transverse beam, the first and second actuators actuable to lean the vehicle while cornering, and wherein the transverse beam remains substantially horizontal when the vehicle leans.

16. The vehicle of claim 15, wherein the at least one headlight is supported by the transverse beam.

17. The vehicle of claim 15, further comprising at least two damping members pivotably supported at a first end by the control arms and pivotably supported at a second end by pivot members extending through the transverse beam.

18. The vehicle of claim 17, further comprising a headlight bracket for supporting the headlight, the headlight bracket being supported by the transverse beam and including an aperture through which the pivot member extends.

19. The vehicle of claim 14, further comprising two front wheels, and wherein the at least one wheel is a single rear wheel.

20. The vehicle of claim 14, wherein the angle of the lean of the headlight is less than 10 degrees when the angle of the lean of the frame is approximately 30 degrees while cornering.

* * * * *